(12) United States Patent
Convent et al.

(10) Patent No.: US 11,476,561 B2
(45) Date of Patent: Oct. 18, 2022

(54) RADAR ANTENNA ARRANGEMENT

(71) Applicant: KROHNE Messtechnik GmbH, Duisburg (DE)

(72) Inventors: Thomas Convent, Issum (DE); Christoph Dahl, Bochum (DE); Michael Gerding, Bochum (DE); Christian Schulz, Bochum (DE); Michael Vogt, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 17/160,880

(22) Filed: Jan. 28, 2021

(65) Prior Publication Data

US 2021/0234261 A1 Jul. 29, 2021

(30) Foreign Application Priority Data

Jan. 28, 2020 (DE) ...................... 10 2020 102 033.3

(51) Int. Cl.
*H01Q 3/24* (2006.01)
*H01Q 1/24* (2006.01)

(52) U.S. Cl.
CPC .............. *H01Q 1/247* (2013.01); *H01Q 3/24* (2013.01)

(58) Field of Classification Search
CPC .................................. H01Q 1/247; H01Q 3/24
See application file for complete search history.

(56) References Cited

U.S. PATENT DOCUMENTS

| 4,352,110 A * | 9/1982 | Braak .................... H04W 16/12 343/844 |
| 8,779,983 B1 * | 7/2014 | Lam ...................... H01Q 21/061 343/700 MS |
| 10,481,249 B2 | 11/2019 | Alenljung et al. |
| 2021/0305693 A1 * | 9/2021 | Howe .................. H01Q 21/205 |

OTHER PUBLICATIONS

Dahl, Christoph, et al.; "Comparison of Virtual Arrays for MIMO Radar Applications based on Hexagonal Configurations"; 2015 European Microwave Conference (EuMC); IEEE; Paris, France; Sep. 7, 2015; 4 Pages.

(Continued)

*Primary Examiner* — Daniel Munoz
(74) *Attorney, Agent, or Firm* — Patrick D. Duplessis (57) ABSTRACT

A radar antenna arrangement includes a plurality of transmitting elements and with a plurality of receiving elements. The transmitting elements are arranged in a transmitting arrangement and the receiving elements are arranged in a receiving arrangement, in each case in fields of a regularly hexagonally parqueted surface. An associated virtual antenna arrangement of virtual antenna elements results from the geometrical convolution of the transmitting arrangement with the receiving arrangement. High angular resolution and good alignability with good directional independence can be achieved by arranging the receiving elements in the receiving arrangement and the transmitting elements in the transmitting arrangement so that the virtual antenna elements in the virtual antenna arrangement are arranged without overlap.

18 Claims, 7 Drawing Sheets

(56) References Cited

OTHER PUBLICATIONS

Biallawons, Oliver, et al.; "MIMO Concept for the Imaging Radar of the Radar Warning and Information System RAWIS"; Proceedings of EUSAR 2016: 11th European Conference on Synthetic Aperture Radar; VDE Verlag; Hamburg, Germany; Jun. 6, 2016; 4 Pages.

Dahl, Christoph, et al.; "MIMO Radar Concepts based on Antenna Arrays with Fractal Boundaries" Proceedings of the 13th European Radar Conference (EuRAD); IEEE; London, UK; Oct. 5, 2016; 4 Pages.

Dahl, Christoph, et al.; "Fractal Antenna Arrays for MIMO Radar Applications"; International Journal of Microwave and Wireless Technologies, vol. 9, Issue 10; Cambridge University Press and the European Microwave Association; Oct. 26, 2017; 10 Pages.

Kwon, Gina, et al.; "Optimization of a Shared-Aperture Dual-Band Transmitting-Receiving Array Antenna for Radar Applications"; IEEE Transactions on Antennas and Propagation, Dec. 2017, vol. 65, No. 12; IEEE; Oct. 23, 2017; 14 Pages.

European Search Report; Application No. EP 20 20 7491; dated Apr. 23, 2021; 3 Pages.

* cited by examiner

RADAR ANTENNA ARRANGEMENT

TECHNICAL FIELD

The invention relates to a radar antenna arrangement having a plurality of transmitting elements and having a plurality of receiving elements, wherein the transmitting elements in a transmitting arrangement and the receiving elements in a receiving arrangement are each arranged in fields of a regularly hexagonally parqueted surface, and wherein an associated virtual antenna arrangement of virtual antenna elements results from the geometric convolution of the transmitting arrangement with the receiving arrangement.

BACKGROUND

Radar antenna arrangements of the type mentioned above are known from the prior art, for example from Dahl et al.: "MIMO Radar Concepts based on Antenna arrangements with Fractal Boundaries", Proceedings of the 13th European Radar Conference, 2016, pages 41-44 or Biallawons et al.: "MIMO concept for the imaging radar of the radar warning and information system RAWIS", 11th European Conference on Synthetic Aperture Radar EUSAR 2016, pages 75-78. Such radar antenna arrangements are often implemented as patch antenna arrangements, which assuming suitable control and evaluation of the transmitting arrangement and the receiving arrangement can, for example, be electronically swiveled by controlling the transmitting elements with appropriate phase delays, resulting in radiation directions deviating from the main radiation direction.

The advantage of the plurality of transmitting elements and receiving elements, in particular when they are operated according to the MIMO principle, i.e. independently of each other, is that each combination of a transmitting element with each receiving element generates a virtual antenna element, so that with m receiving elements and n transmitting elements a maximum of n*m virtual antenna elements result, whose positions are derived from the geometric convolution of the positions of the transmitting elements in the transmitting arrangement with the positions of the receiving elements in the receiving arrangement. In plain language, the geometric convolution of the structures of the transmitting arrangement and receiving arrangement is a shifting and superimposition operation, whereby the transmitting arrangement or the receiving arrangement is shifted to the individual positions of the receiving elements or the individual positions of the transmitting elements, resulting in the sum of the positions of the virtual antenna arrangements. The virtual antenna arrangement necessarily has a larger aperture than the apertures of the receiving arrangement and the transmitting arrangement and characterizes the imaging properties of the radar antenna arrangement when operated according to the MIMO principle.

SUMMARY

The object of the present invention to provide such radar antenna arrangements which have the best possible angular resolution and also electronic ability to be swiveled, wherein the properties are as isotropic as possible, i.e., independent of direction.

The previously derived object is achieved in the radar antenna arrangement mentioned at the beginning in that the receiving elements in the receiving arrangement and the transmitting elements in the transmitting arrangement are arranged such that the virtual antenna elements in the virtual antenna arrangement are arranged without overlap. This requirement ensures that the yield of virtual antenna elements in the virtual antenna arrangement is maximized, which has a positive effect on angular resolution and (electronic) ability to swivel.

In an advantageous design of the radar antenna arrangement, it is provided that the transmitting elements and the receiving elements are arranged without overlap in fields of a common regularly hexagonally parqueted surface. This offers, above all, constructional advantages, since there can be no overlaps of or collisions between positions of transmitting elements and receiving elements. This is also advantageous with regard to the electrical contacting of transmitting elements and receiving elements, which must always be carried out, since this design specification ensures minimum distances between transmitting elements and receiving elements.

According to a preferred design, the radar antenna arrangement further provides that a plurality of transmitting elements form a transmitting element group or that a plurality of receiving elements form a receiving element group, wherein the radar antenna arrangement comprises a plurality of similar transmitting element groups or receiving element groups. A radar antenna arrangement designed according to this stipulation has partial advantages due to the resulting recurring structures in the virtual antenna arrangement. Another advantage is that recurring structures in the radar antenna arrangement also enable recurring structures in the implementation of the radar electronics. Furthermore, advantageous possibilities also arise in the desired implementation of radar antenna arrangements with special symmetry properties. In particular, in this respect, a further advantageous design is characterized in that the plurality of similar transmitting element groups or the plurality of similar receiving element groups are arranged such that the transmitting arrangement and/or the receiving arrangement have a rotational symmetry of 60° or a rotational symmetry of 120°. Such a symmetry is also transferred to the virtual antenna arrangement due to the geometric convolution of the transmitting arrangement with the receiving arrangement, which has an effect on the directional independence of the radiation and reception characteristics of the radar antenna arrangement if the geometric design of the transmitting element groups and/or the receiving element groups is cleverly chosen. When considering whether a particular arrangement of multiple receiving element groups and/or of multiple transmitting element groups is considered to exhibit rotational symmetry, a mathematically strict or a less strict definition of rotational symmetry may be used. In the mathematically strict definition, both the positions and the orientations of the receiving and/or transmitting element groups are considered. With the mathematically weaker definition only the positions of the receiving and/or transmitting element groups are considered, the orientation of the receiving and/or transmitting element groups does not play a role, the receiving and/or transmitting element groups are thus considered each for itself as concentrated in one point.

In a further preferred design of the radar antenna arrangement, it s provided that a predominant number of the transmitting elements of the transmitting arrangement is/are arranged alone or grouped in transmitting element groups with several transmitting elements on a transmitting circular circumference, in particular is/are arranged regularly distributed on the transmitting circular circumference. This has the advantages that, due to the circular shape, the greatest possible directional independence is realized and, at the same time, a maximum aperture is also implemented, both for the transmitting arrangement and for the virtual antenna arrangement. Specifically, it is provided that all but three of the transmitting elements of the transmitting arrangement are arranged on the transmitting circular circumference, in particular completely all transmitting elements of the transmitting arrangement are arranged on the transmitting circular circumference. This all applies accordingly, of course, to the receiving elements as well, which is why this is not repeated again here in a formulated manner. In principle it applies to all characteristics, which are assigned to the transmitting arrangement or the receiving arrangement, that then corresponding considerations are also always valid for the receiving arrangement and/or the transmitting arrangement.

A further preferred radar antenna arrangement is characterized in that the receiving elements of the receiving arrangement are arranged within a receiving circle circumference, in particular wherein the receiving circle circumference is identical with the transmitting circle circumference, or wherein the receiving circle circumference is smaller than the transmitting circle circumference, preferably arranged concentrically to the transmitting circle circumference. In this way, compact arrangements can be implemented which also exhibit good directional independence. Arrangements can also be implemented in which the receiving arrangement is located within the transmitting arrangement and is practically surrounded by it. Exactly the same considerations are as stated above correspondingly valid for reversed roles of transmitting and receiving elements, which will not be explicitly emphasized in the following.

A further radar antenna arrangement has certain advantageous features in that three transmitting elements each form a closely packed triangular transmitting element group and a total of six of these transmitting element groups are evenly distributed on the transmitting circle circumference, in particular with a further one of these transmitting element groups being arranged in the center of the transmitting circle circumference.

It has also proved advantageous that the receiving elements are arranged loosely contiguously, wherein each receiving element is surrounded by six unoccupied fields of the regularly hexagonally parqueted surface and wherein each receiving element is adjacent to two receiving elements either via at least one adjacent unoccupied field of the regularly hexagonally parqueted surface or via at least two directly and also mutually adjacent unoccupied fields of the regularly hexagonally parqueted surface. It may additionally be provided that unoccupied fields are provided in the center of the arrangement in the regularly hexagonally parqueted surface, these unoccupied fields forming a triangular shape in sum.

Another preferred design is characterized in that a transmitting element group or the transmitting arrangement comprises three transmitting elements, wherein the three transmitting elements are densely packed, i.e., each transmitting element is immediately adjacent to the other two transmitting elements, or wherein the three transmitting elements enclose a common unoccupied field of the regularly hexagonally parqueted surface, or wherein the three transmitting elements enclose three immediately adjacent unoccupied fields of the regularly hexagonally parqueted surface, wherein the three transmitting elements form the vertices of an equilateral triangle.

In another advantageous radar antenna arrangement, a transmitting element group or the transmitting arrangement comprises four transmitting elements, wherein three of the transmitting elements form the vertices of an equilateral triangle and the fourth transmitting element is placed in the center of the equilateral triangle.

In yet another advantageous radar antenna arrangement, a transmitting element group or the transmitting arrangement comprises five transmitting elements, wherein three transmitting elements are arranged in three linearly adjacent arrangements, i.e., flat side to flat side, and wherein two transmitting elements are arranged perpendicularly symmetrically thereto in adjacent arrangements, i.e., tip to tip. In this respect, it is further advantageous if three transmitting element groups are provided which are arranged 120° rotationally symmetrically and have an additional common transmitting element to which the transmitting element groups.

With regard to the radar antenna arrangement with a total of five transmitting elements, it is provided in an alternative design that the five transmitting elements are loosely connected in the same configuration, i.e., three elements linearly, in addition two elements symmetrically perpendicularly, wherein each transmitting element is surrounded by six unoccupied fields of the regularly hexagonally parqueted surface.

A preferred feature of a radar antenna arrangement is that the number of transmitting elements to the number of receiving elements is in the ratio 3 to 4. This makes it possible to use corresponding electronic components which provide connections in the same ratio and which are available in large quantities at comparatively low prices; such components are frequently used in the automotive sector, for example.

BRIEF DESCRIPTION OF THE DRAWINGS

There are now various possibilities for designing and further developing the radar antenna arrangement according to the invention. For this purpose, reference is made to the following description of embodiments in connection with the drawings. The drawings are of particular importance in the present subject matter of the invention, since the arrangements sometimes have a complex geometry and structure which cannot be described with reasonable effort either in words or mathematically. The graphical representation is therefore a central means of disclosing the structures and geometries of interest.

DETAILED DESCRIPTION

In FIGS. 1 to 11, various radar antenna arrangements 1 are shown in their entirety or only in part. The radar antenna arrangements 1 each have a plurality of transmitting elements 2 and also a plurality of receiving elements 3, wherein the transmitting elements 2 are arranged in a transmitting arrangement 4 and the receiving elements 3 are arranged in a receiving arrangement 5 in fields of a regularly hexagonally parqueted surface 6 without overlap.

The hexagonally parqueted surface 6 is indicated in each case by a hexagonal grid. Fields occupied by transmitting elements 2 and receiving elements 3 are indicated by corresponding hatching. In order to maintain a certain overview, not all transmitting elements and not all, but only a few, receiving elements are provided with reference signs; this does not detract from the understanding.

The overlap-free arrangement of the transmitting elements 2 and the receiving elements 3 in the fields of the hexagonally parqueted surface 6 means that a transmitting element 2 and a receiving element 3 are never implemented simultaneously in a hexagonal field. The hexagonal fields shown do not mean that the transmitting elements or receiving elements arranged in these fields also have a hexagonal basic structure; this may be so, but need not be so.

A virtual antenna arrangement 7 of virtual antenna elements 8 can be associated with the radar antenna arrangements 1, wherein the positions of the virtual antenna elements 8 result from the geometric convolution of the positions of the transmitting elements 2 in the transmitting arrangement 4 with the positions of the receiving elements 3 in the receiving arrangement 5. Each transmitting element 2 interacts with each receiving element 3, wherein the interaction of all transmitting elements 2 with all receiving elements 3 is described by the geometric convolution described previously.

The position of the transmitting arrangement 4 relative to the receiving arrangement 5 has, in principle, no effect on the geometrical structure of the associated and resulting virtual antenna arrangement 7. Nor does the effect of the resulting virtual antenna arrangement 7 change, at least not in a far-field view, i.e. when the field characteristics are viewed at a large distance relative to the dimensions of the antenna arrangement 1. The transmitting arrangement 4 can therefore be moved relative to its receiving arrangement 5 without this having any effect on the appearance of the virtual antenna arrangement 7 per se. However, by moving the transmitting arrangement 4 relative to the receiving arrangement 5, the physical coupling of the transmitting arrangement 4 to the receiving arrangement 5 can be affected.

Figure 1:
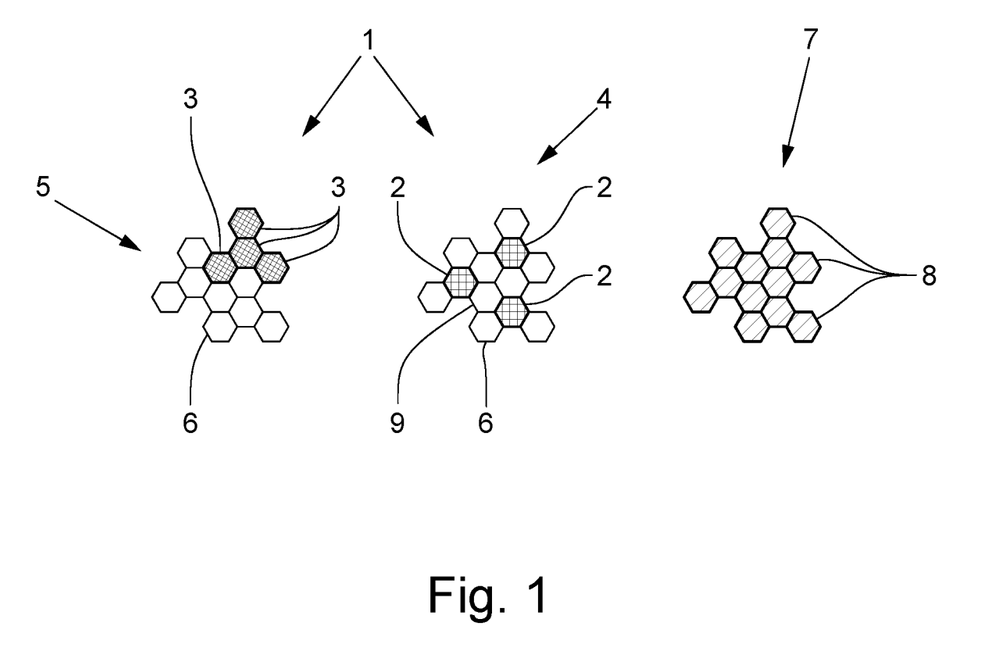
FIG. 1 illustrates an embodiment of a radar antenna arrangement with a small number of transmitting elements and receiving elements.
Figure 2:
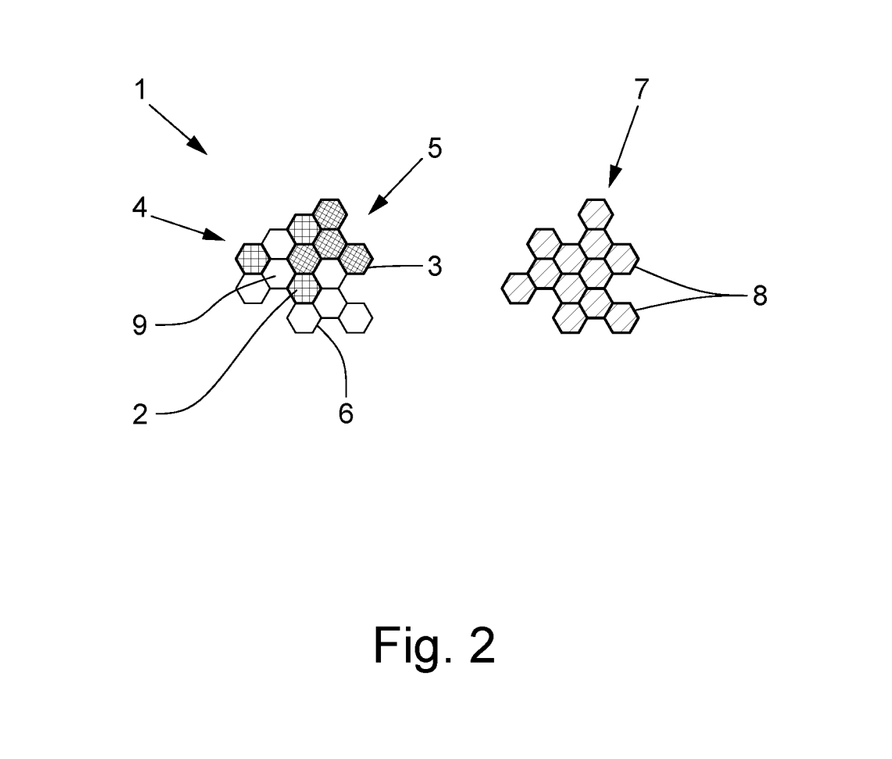
FIG. 2 illustrates a possible combination of the transmitting arrangement and the receiving arrangement according to FIG. 1 in a common radar antenna arrangement.

The basic relationships are readily apparent from FIGS. 1 and 2, which show only a few transmitting elements 2 and receiving elements 3. The transmitting arrangement 4 has three transmitting elements 2 and the receiving arrangement 5 has four receiving elements 3. The transmitting elements 2 include three immediately adjacent unoccupied fields 9 of the regularly hexagonally parqueted surface 6. The receiving arrangement 5 comprises four receiving elements 3, three of the receiving elements 3 forming the vertices of an equilateral triangle and the fourth receiving element 3 being placed in the center of the equilateral triangle. On the far right of FIG. 1, the resulting virtual antenna arrangement 7 with the virtual antenna elements 8 is shown, which results from the geometric convolution of the transmitting arrangement 4 with the receiving arrangement 5. It can be seen that the aperture of the virtual antenna arrangement 8 is significantly larger than the apertures of the transmitting arrangement 4 or the receiving arrangement 5, which has a positive effect on the resolving power of the radar antenna arrangement 1. The transmitting arrangement 4 and the receiving arrangement 5 are shown here side by side so that they can be better distinguished from each other in the illustration.

FIG. 2 structurally shows an identical transmitting arrangement 4 and an identical receiving arrangement 5 as in FIG. 1. Here, however, the arrangements 4, 5 are shifted into each other, which has no effect on the appearance of the resulting virtual antenna arrangement 7. Thus, the radar antenna arrangement 1 with the transmitting arrangement 4 and the receiving arrangement 5 as shown in FIG. 1 can be implemented in a very compact manner. In the following figures, the transmitting arrangements 4 and the receiving arrangements 5 are mostly shown separately so that the structures can be better identified. The transmitting arrangements 4 and the receiving arrangements 5 can also be shifted into each other provided that this is possible without overlap—as has been shown with reference to the embodiments in FIGS. 1 and 2. As has been explained previously, each radar antenna arrangement 1 shown has a perfectly corresponding radar antenna arrangement in which transmitting elements are replaced by receiving elements and vice versa.

Figure 3A:
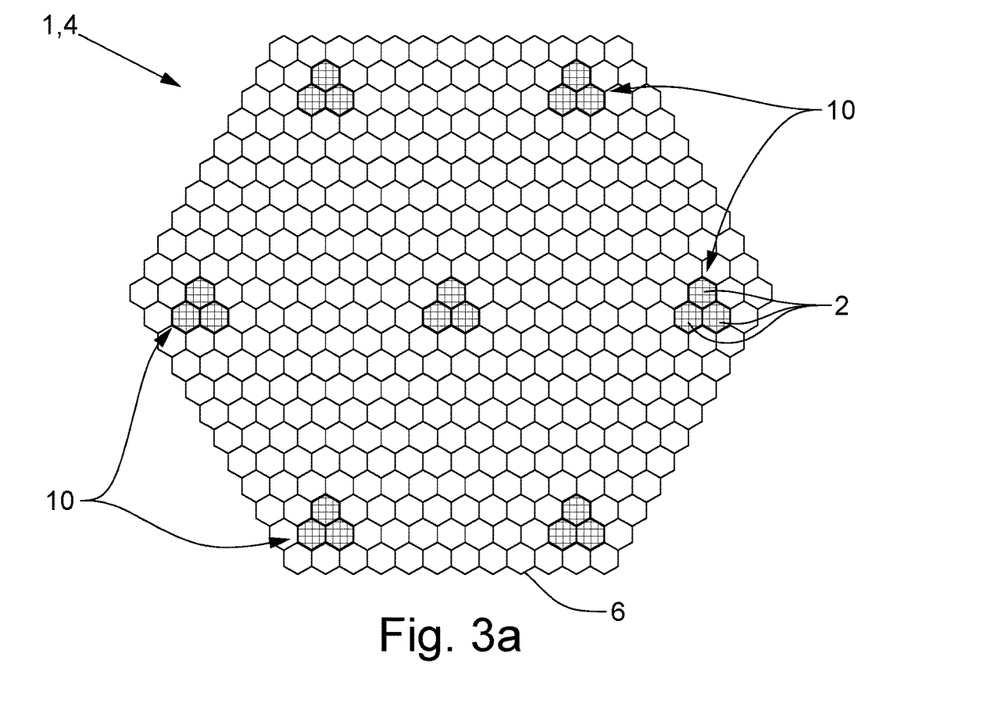
FIGS. 3a and 3b illustrate a hexagonal arrangement of transmitting elements and receiving elements, respectively.
Figure 3B:
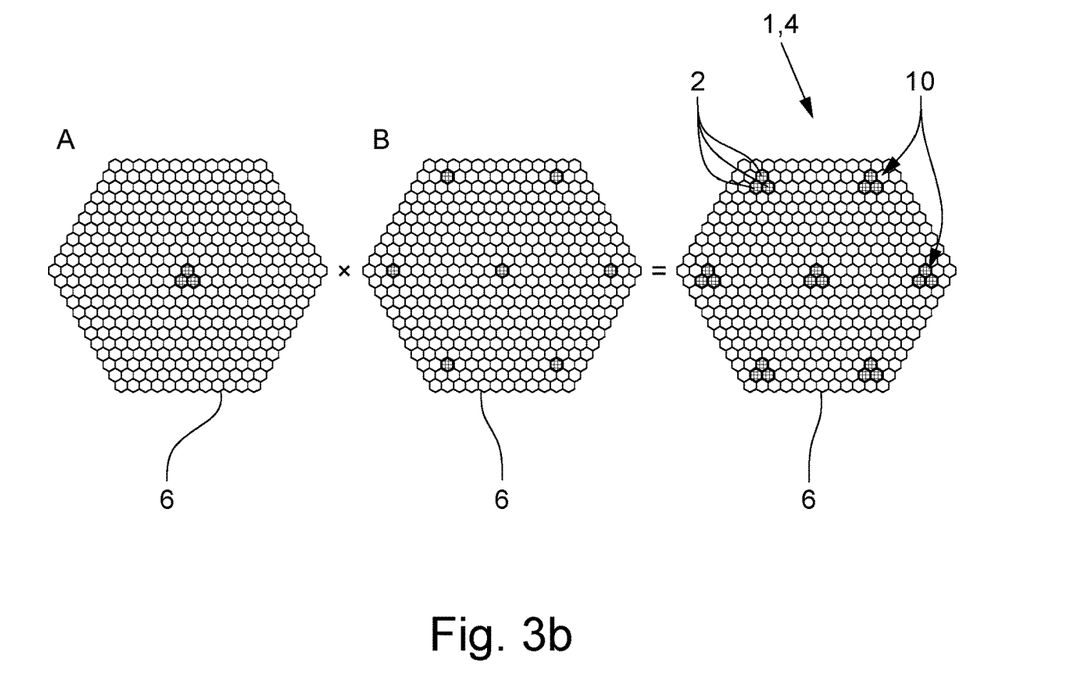

FIG. 3b shows how the geometric convolution of the imaginary transmitting arrangements A, B can be used to obtain the real transmitting arrangement 4, which is shown separately in FIG. 3a.

The radar arrangements 1 in FIGS. 1 to 11 have in common that the receiving elements 3 in the receiving arrangement 5 and the transmitting elements 2 in the transmitting arrangement 4 are arranged such that the virtual antenna elements 8 in the virtual antenna arrangement 7 are arranged without overlap. This results in a maximum possible number of effective virtual antenna elements 8, which has a positive effect on the angular resolution and also on the signal-related swivel capability of the illustrated radar antenna arrangements.

Figure 8:
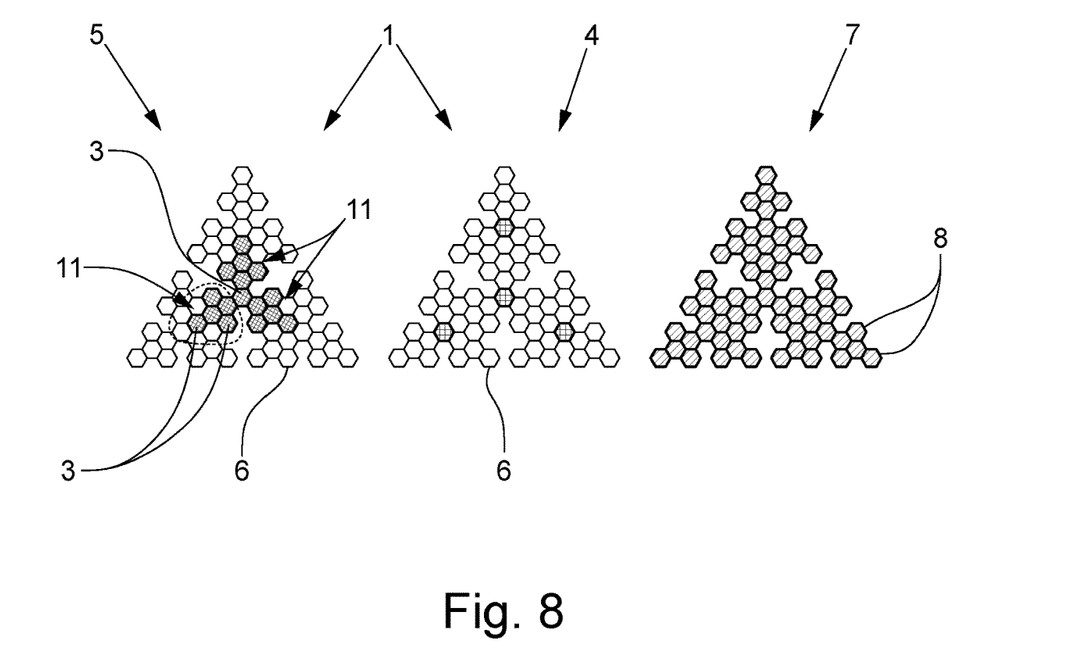
FIG. 8 illustrates a radar antenna arrangement with 16 receiving elements and 4 transmitting elements.
Figure 9:
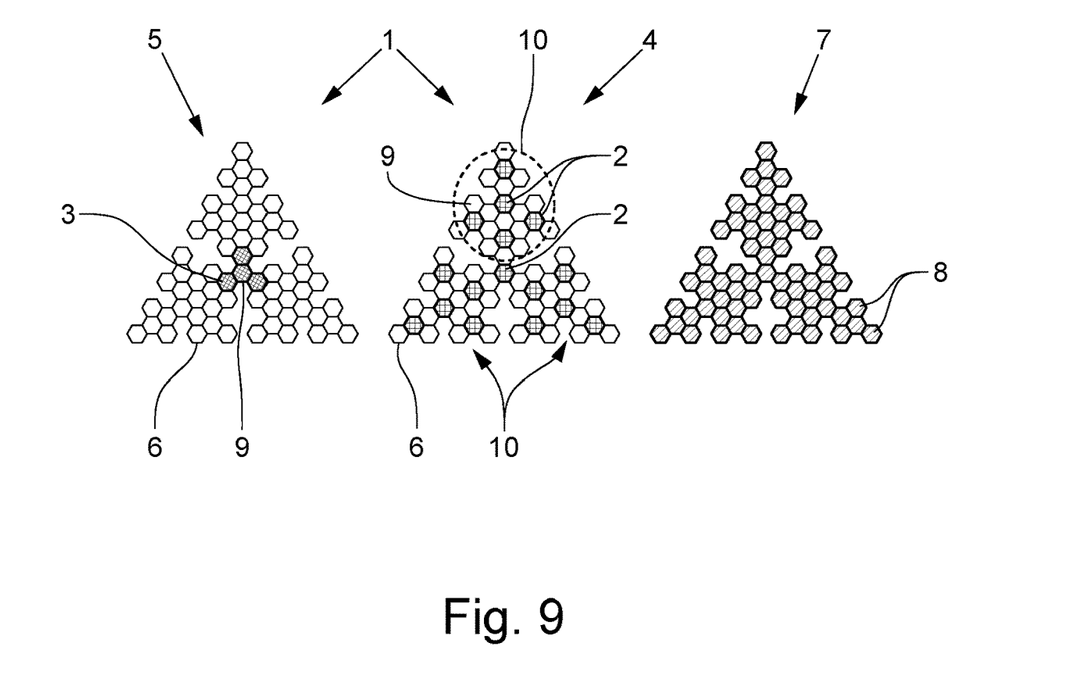
FIG. 9 illustrates a radar antenna arrangement with 3 receiving elements and 16 transmitting elements.
Figure 10:
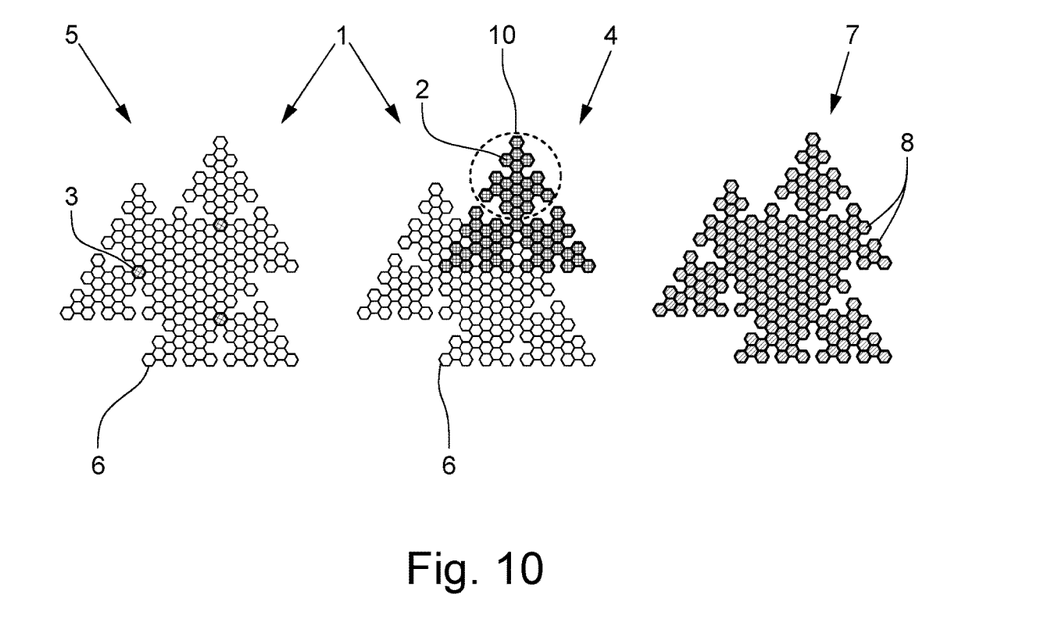
FIG. 10 illustrates a radar antenna arrangement with 3 receiving elements and 64 transmitting elements.
Figure 11:
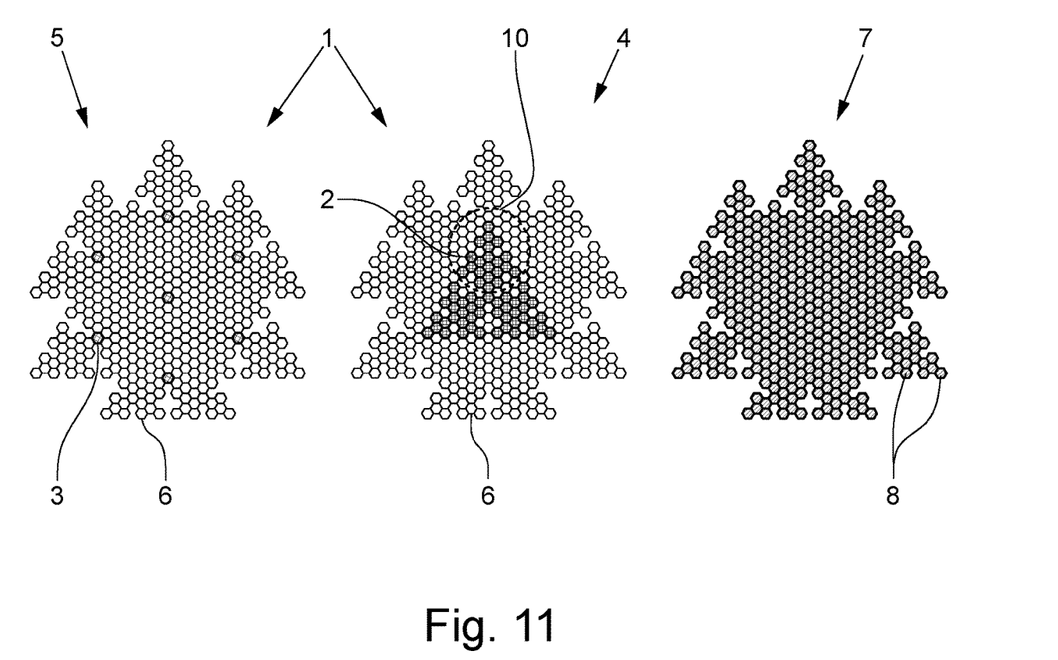
FIG. 11 illustrates a radar antenna arrangement with 7 receiving elements and 64 transmitting elements.

In the embodiment examples according to FIGS. 3, 5, 6 and 8 to 11, it is provided that a plurality of transmitting elements 2 form a transmitting element group 10 and/or a plurality of receiving elements 3 form a receiving element group 11, wherein the radar antenna arrangements then have a plurality of similar transmitting element groups 10 and/or receiving element groups 11. In several of the embodiments, the plurality of similar transmitting element groups 10 and/or the plurality of similar receiving element groups 11 are arranged such that the transmitting arrangement 4 and/or the receiving arrangement 5 have a rotational symmetry of 60° or a rotational symmetry of 120°. In FIG. 3a, for example, seven transmitting element groups 10 are comprised by the transmitting arrangement 4, wherein each transmitting element group 10 consists of three transmitting elements 2 that are densely packed. The same applies to the transmitting arrangement 4 in FIG. 5. The transmitting arrangement 4 according to FIG. 6 differs in the number of transmitting element groups 10; here, in contrast to the embodiment according to FIG. 5, only six transmitting element groups 10 are implemented. In FIG. 8, the receiving arrangement 5 has three receiving element groups 11, which are jointly adjacent to each other via a central receiving element 3. In FIG. 9, the transmitting arrangement 4 has three transmitting element groups 10, each with four transmitting elements 2, and a central transmitting element 2 also exists here. In FIGS. 10 and 11, identical transmitting arrangements 4 are used, each with three transmitting element groups 10 of the same type; the difference here is in the number and arrangement of the receiving elements 3 in the receiving arrangement 5.

In the figures in which several similar transmitting element groups 10 or several similar receiving element groups 11 are shown, these are, at the same time, arranged such that the transmitting arrangements 4 concerned and/or the receiving arrangements 5 concerned have a rotational symmetry of 60° (FIGS. 3, 5 and 6 assuming a mathematically weak definition of rotational symmetry) or a rotational symmetry of 120° (FIGS. 3, 4, 5, 6 and 8 to 11).

In the embodiments according to FIGS. 1 to 3 and 5 to 11, a predominant number of the transmitting elements 2 of the transmitting arrangement 4 is arranged either alone or grouped in transmitting element groups 10 with several transmitting elements 2 on an (imaginary) transmitting circular circumference, in this case even regularly distributed on the transmitting circular circumference. In the embodiment example according to FIG. 6, even completely all transmitting elements 2—here arranged in transmitting element groups 10—are arranged on a transmitting circle circumference, in the other embodiment examples in each case also a further transmitting element 2 is provided in the center of the transmitting circle circumference. The same also applies to the embodiments in FIGS. 1, 2, 7 to 11 for the receiving elements 3 of the receiving arrangement 5 taken by themselves or grouped in receiving element groups 11 with several receiving elements 3. In the embodiment examples according to FIGS. 9 and 10, all receiving elements 3 of the receiving arrangement 5 are completely arranged on the receiving circular circumference not shown.

Figure 4A:
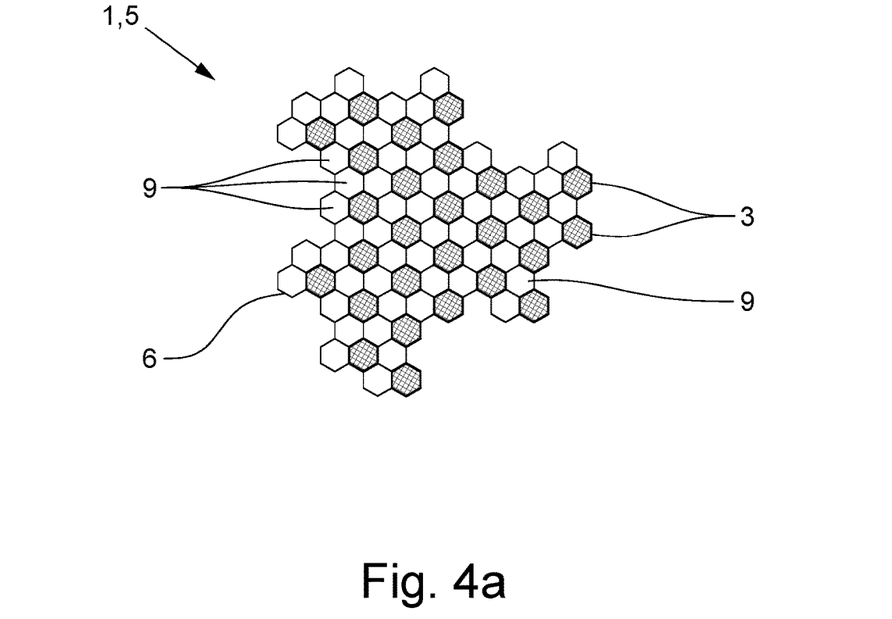
FIGS. 4a and 4b illustrate an arrangement of transmitting elements and receiving elements, respectively, that are loosely connected.
Figure 4B:
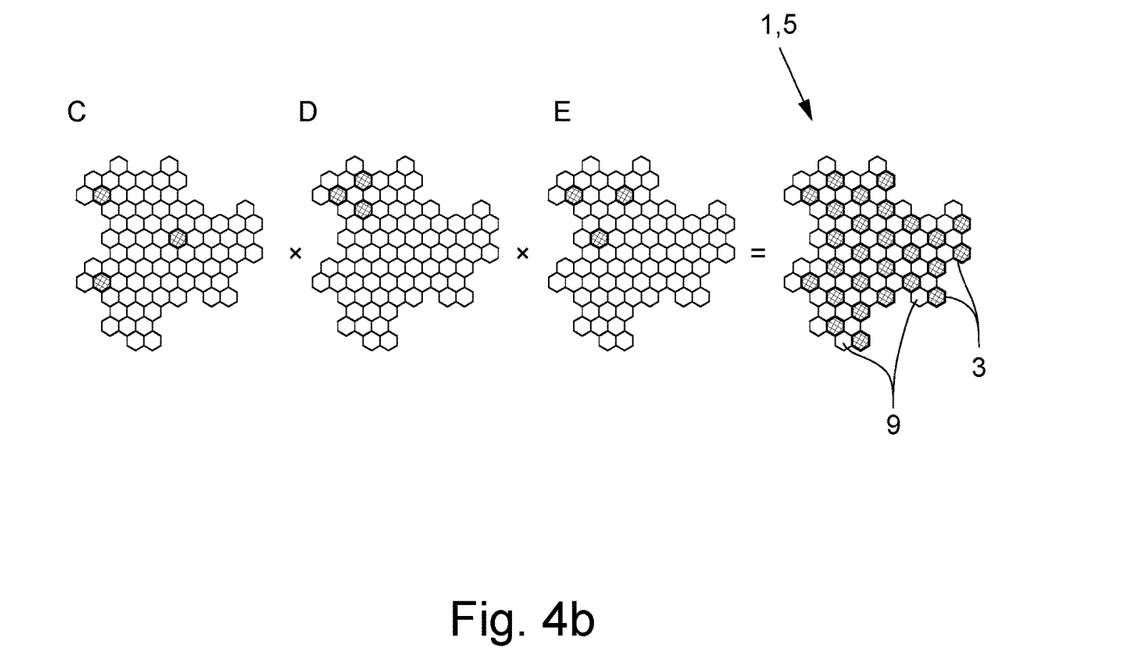
Figure 5:
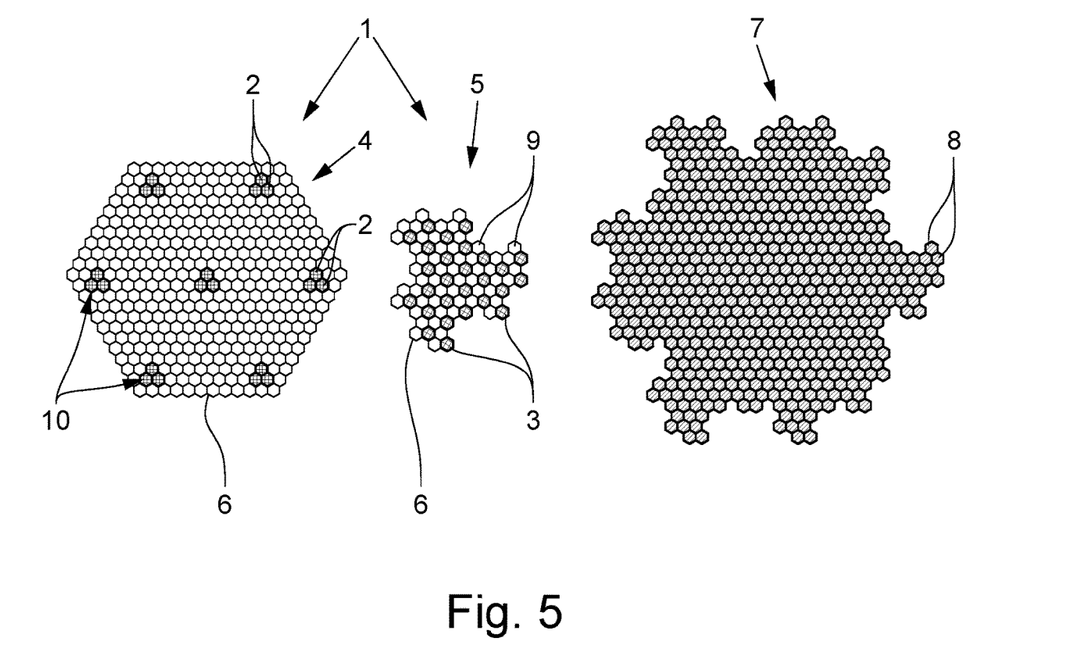
FIG. 5 illustrates a radar antenna arrangement resulting in a 120° rotationally symmetric dense virtual antenna arrangement.

FIG. 4a shows a receiving arrangement 5 whose receiving elements 3 are arranged within a receiving circle circumference which is not shown. FIG. 4b merely illustrates how the geometric convolution of three different imaginary receiving arrangements (C, D, E) can be used to obtain the real receiving arrangement 5 shown separately in FIG. 4a. The same receiving arrangement 5 shown in FIGS. 4a, 4b is again the subject of FIG. 5. Here the receiving arrangement 5 is shown together with the transmitting arrangement 4, which is already known from FIG. 3. When the transmitting arrangement 4 and the receiving arrangement 5 shown in FIG. 5 are combined, the result is the virtual antenna arrangement 7 shown in FIG. 5, which is extremely compact and a good approximation of a circular shape. This makes this radar antenna arrangement 1 particularly suitable for achieving the most isotropic angular resolution possible and also electronic ability to be tilted.

Figure 6:
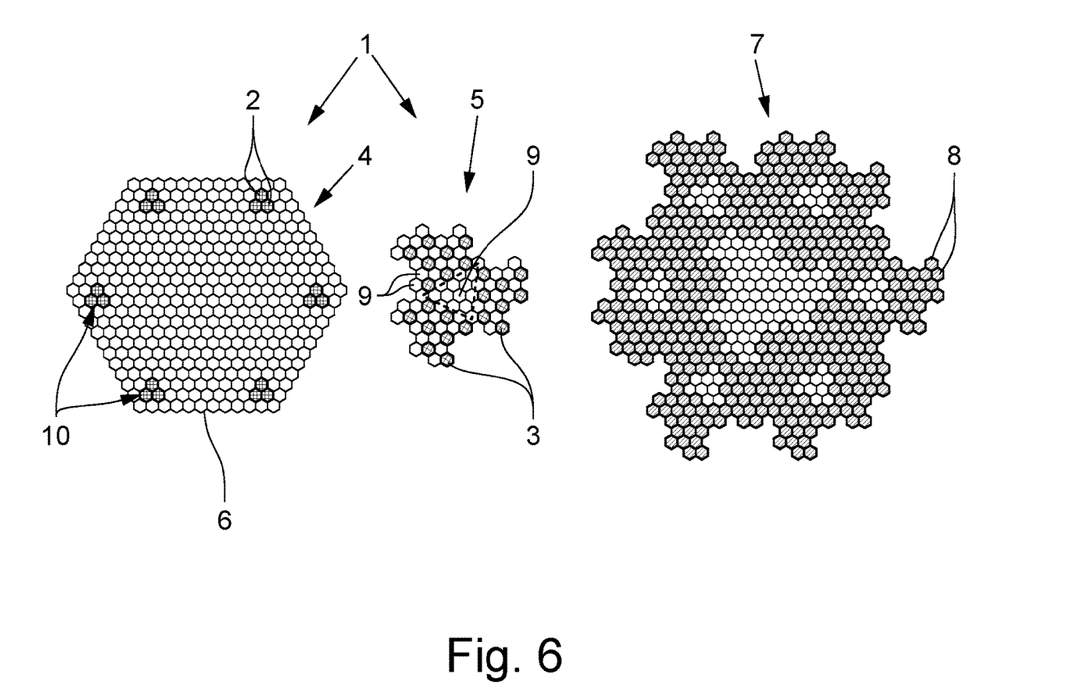
FIG. 6 illustrates a radar antenna arrangement resulting in a 120° rotationally symmetric thinned virtual antenna arrangement.

The embodiment according to FIG. 6 corresponds to the embodiment according to FIG. 5, but central elements have been omitted here, both in the transmitting arrangement 4 and in the receiving arrangement 5. This also results in a thinned-out virtual antenna arrangement 7, which is also shown in FIG. 6. It is quite conceivable that the receiving arrangement 5 is arranged in a receiving circular circumference that is smaller than the transmitting circular circumference of the transmitting arrangement 4. An actual implementation of the radar antenna arrangement 1 according to FIG. 6 could therefore also be such that the receiving arrangement 5 is arranged within the transmitting arrangement 4, i.e. the imaginary receiving circular circumference and the imaginary transmitting circular circumference are quasi concentric with each other. Of course, an analogous realization of the radar antenna arrangement could be made, in which the transmitting elements 2 and receiving elements 3 are exchanged.

FIGS. 3, 5 and 6 show radar antenna arrangements 1 in which three transmitting elements 2 each form a closely packed triangular transmitting element group 10 and a total of six of these transmitting element groups 10 are evenly distributed on the transmitting circle circumference. Another of these transmitting element groups 10 is arranged in the center of the transmitting circle circumference in the radar antenna arrangements in FIGS. 3 and 5.

In the radar arrangements 1 in FIGS. 4, 5 and 6, the receiving elements 3 are loosely contiguous in the receiving arrangements 5 shown, each receiving element 3 being surrounded by six unoccupied fields 9 of the regularly hexagonally parqueted surface 6. Each receiving element 3 is adjacent to two other receiving elements 3 via at least one adjacent unoccupied field 9 of the regularly hexagonally parqueted surface 6, particularly according to FIGS. 4, 5 and 6. In FIG. 6, unoccupied fields 9 in the regularly hexagonally parqueted surface 6 are provided in the center of the arrangement, wherein these unoccupied fields form a triangular shape in sum.

In the radar antenna arrangements 1 according to FIGS. 3, 5, 6 and 7a, a transmitting element group 10 or the transmitting arrangement 4 comprises three transmitting elements 2 or a receiving element group 11 or the receiving arrangement 5 comprises three receiving elements 3, wherein the three transmitting elements 2 or the three receiving elements 3 are densely packed, i.e. each transmitting element 2 is directly adjacent to the other two transmitting elements 2 or each receiving element 3 is directly adjacent to the other two receiving elements 3. This arrangement makes use of the 120° rotational symmetry of the hexagonal parquetry on the smallest possible area. in FIG. 9 it is shown that three receiving elements 3 enclose a common unoccupied field 9 of the regularly hexagonally parqueted surface 6. In contrast, in the radar arrangements according to FIGS. 1 and 2, three transmitting elements 2 enclose three directly adjacent unoccupied fields 9 of the regularly hexagonally parqueted surface 6. In FIG. 10, three receiving elements 3 form the vertices of a larger equilateral triangle.

Figure 7A:
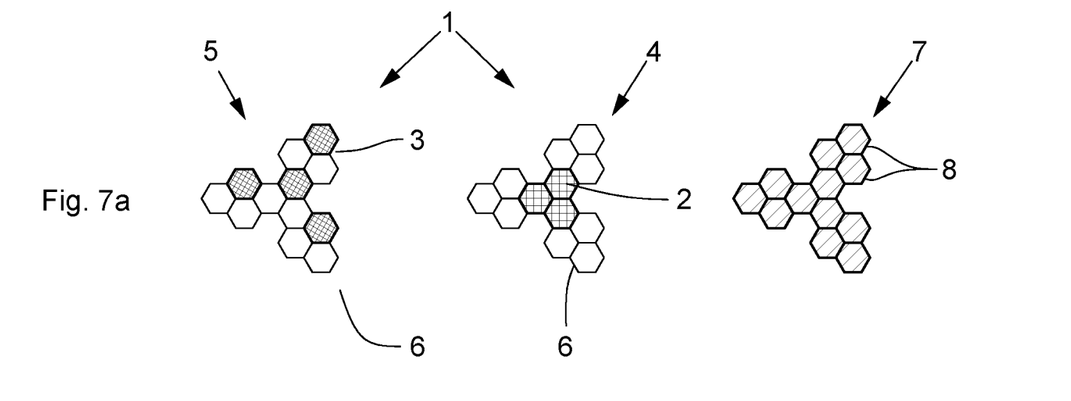
FIGS. 7a, 7b, and 7c illustrate embodiments of radar antenna arrangements with few transmitting elements and receiving elements.
Figure 7B:
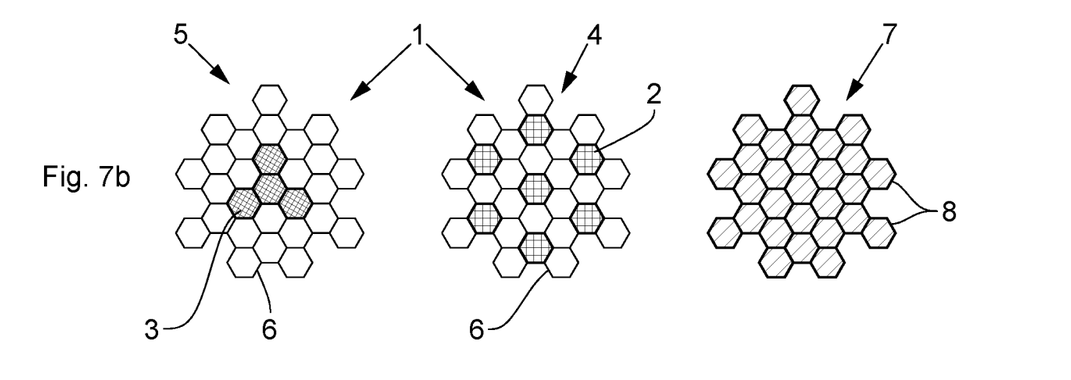
Figure 7C:
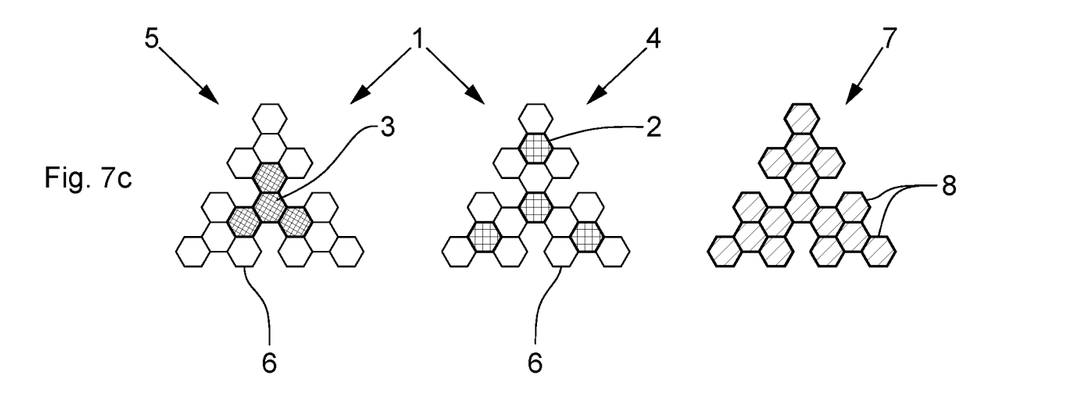

The radar antenna arrangements 1 shown in FIGS. 7c and 8 are characterized in that the transmitting arrangement 4 comprises four transmitting elements 2, wherein three of the transmitting elements 2 form the vertices of an equilateral triangle and the fourth transmitting element 2 is placed in the center of the equilateral triangle. The same applies to the receiving elements 3 in the receiving arrangements 5 in FIGS. 1, 2 and 7a.

FIG. 8 shows a radar antenna arrangement 1 with receiving element groups 11, each comprising five receiving elements 3, wherein three receiving elements 3 are arranged in three linearly adjacent fields, i.e. flat side to flat side, and two receiving elements are arranged perpendicularly symmetrically thereto in 3 adjacent fields, i.e. tip to tip, so that an elongated cross-shaped arrangement of the receiving elements 3 results. The radar antenna arrangement according to FIG. 8 has a total of three of the previously described receiving element groups 11, which are arranged 120° rotationally symmetrically. In addition, a common receiving element 3 is provided, to which the receiving element groups 11 are adjacent. According to an alternative view, the receiving arrangement 5 in FIG. 8 can also be regarded as being composed of four similarly structured, star-shaped receiving element groups, each with four receiving elements 3.

A similar configuration is shown by the radar antenna arrangement 1 in FIG. 9, where the five receiving elements 3 are arranged in the same configuration, i.e., three receiving elements 3 linearly, plus two receiving elements 3 symmetrically perpendicularly, loosely connected, wherein each receiving element 3 is surrounded by six unoccupied fields 9 of the regularly hexagonally parqueted surface 6.

In FIGS. 10 and 11, radar antenna arrangements 1 are shown in each case with three 120° rotationally symmetrically arranged transmitting element groups 10 each with 21 transmitting elements 2, wherein the three transmitting element groups 10 are adjacent to a common separate central transmitting element 2. The fir-tree-shaped arrangements are also characterized by very high achievable angular resolution and electronic antenna ability to be swiveled over a wide range, The radar antenna arrangements 1 in which the number of transmitting elements 2 to the number of receiving elements 3 is in the ratio 3 to 4, as thus in the arrangements according to FIGS. 1, 2 and 6, have the advantage that corresponding electronic components can be used and are also used which provide connections for the output of transmitting signals and the reception or processing of receiving signals in the same ratio; these electronic components are available in large quantities at comparatively low prices, which is why radar antenna arrangements 1 which follow this requirement can also be manufactured comparatively inexpensively.

The invention claimed is:

1. A radar antenna arrangement, comprising:
transmitting elements; and
receiving elements;
wherein the transmitting elements are arranged in a transmitting arrangement and the receiving elements are arranged in a receiving arrangement, in each case in fields of a regularly hexagonally parqueted surface;
wherein an associated virtual antenna arrangement of virtual antenna elements results from the geometrical convolution of the transmitting arrangement with the receiving arrangement;
wherein the receiving elements in the receiving arrangement and the transmitting elements in the transmitting arrangement are arranged such that the virtual antenna elements in the virtual antenna arrangement are arranged without overlap;
wherein at least a predominant number of the transmitting elements of the transmitting arrangement are regularly distributed on a transmitting circular circumference, individually or grouped in transmitting element groups each having a plurality of the transmitting elements, or at least a predominant number of the receiving elements of the receiving arrangement is/are regularly distributed on a receiving circular circumference, individually or grouped in receiving element groups each having plurality of the receiving elements; and
wherein three transmitting elements each form a densely packed triangular transmitting element group and a total of six of these transmitting element groups are uniformly distributed on the transmitting circular circumference, with a further one of these transmitting element groups being arranged in the center of the transmitting circular circumference, or three receiving elements each form a densely packed triangular receiving element group and a total of six of these receiving element groups are distributed uniformly on the receiving circular circumference, with a further one of these receiving element groups being arranged in the center of the receiving circular circumference.

2. The radar antenna arrangement according to claim 1, wherein the transmitting elements and the receiving elements are arranged without overlap in fields of a common regularly hexagonally parqueted surface.

3. The radar antenna arrangement according to claim 2, wherein a plurality of the transmitting elements form a transmitting element group and/or a plurality of the receiving elements form a receiving element group; and
wherein the radar antenna arrangement has a plurality of similar transmitting element groups and/or receiving element groups.

4. The radar antenna arrangement according to claim 3, wherein the plurality of similar transmitting element groups and/or the plurality of similar receiving element groups are arranged such that the transmitting arrangement and/or the receiving arrangement has a rotational symmetry of 60° or a rotational symmetry of 120°.

5. The radar antenna arrangement according to claim 1, wherein a number of the receiving elements of the receiving arrangement are arranged within the receiving circular circumference; or
wherein a number of the transmitting elements of the transmitting arrangement are arranged within the transmitting circular circumference.

6. The radar antenna arrangement according to claim 5, wherein the receiving circular circumference is identical to the transmitting circular circumference.

7. The radar antenna arrangement according to claim 5, wherein the receiving circular circumference is arranged concentrically to the transmitting circular circumference; and
wherein the receiving circular circumference is smaller than the transmitting circular circumference, or the transmitting circular circumference is smaller than the receiving circular circumference.

8. The radar antenna arrangement according to claim 1, wherein the receiving elements are arranged loosely contiguous, wherein each receiving element is surrounded by six unoccupied fields of the regularly hexagonally parqueted surface and each receiving element is adjacent to two receiving elements via at least one adjacent unoccupied field of the regularly hexagonally parqueted surface, or
wherein the transmitting elements are arranged loosely connected, wherein each transmitting element is surrounded by six unoccupied fields of the regularly hexagonally parqueted surface and each transmitting element is adjacent to two transmitting elements via at least one adjacent unoccupied field of the regularly hexagonally parqueted surface.

9. The radar antenna arrangement according to claim 8, wherein unoccupied fields collectively forming a triangular shape are provided in the center of the arrangement in the regularly hexagonally parqueted surface.

10. The radar antenna arrangement according to claim 1, wherein a transmitting element group or the transmitting arrangement includes three transmitting elements or a receiving element group or the receiving arrangement includes three receiving elements, wherein the three transmitting elements or the three receiving elements are densely packed such that each transmitting element is directly adjacent to two other transmitting elements or each receiving element is directly adjacent to two other receiving elements, or wherein the three transmitting elements or the three receiving elements enclose a common unoccupied field of the regularly hexagonally parqueted surface, or wherein the three transmitting elements or the three receiving elements enclose three directly adjacent unoccupied fields of the regularly hexagonally parqueted surface, and/or wherein the three transmitting elements or the three receiving elements form the corner points of a larger equilateral triangle.

11. The radar antenna arrangement according to claim 1, wherein a transmitting element group or the transmitting arrangement includes four transmitting elements or a receiving element group or the receiving arrangement includes four receiving elements, wherein three of the transmitting elements form the corner points of an equilateral triangle and wherein the fourth transmitting element is placed in the center of the equilateral triangle, or wherein three of the receiving elements form the corner points of an equilateral triangle and wherein the fourth receiving element is placed in the center of the equilateral triangle.

12. A radar antenna arrangement, comprising:
transmitting elements; and
receiving elements;
wherein the transmitting elements are arranged in a transmitting arrangement and the receiving elements are arranged in a receiving arrangement, in each case in fields of a regularly hexagonally parqueted surface;
wherein an associated virtual antenna arrangement of virtual antenna elements results from the geometrical convolution of the transmitting arrangement with the receiving arrangement;
wherein the receiving elements in the receiving arrangement and the transmitting elements in the transmitting arrangement are arranged such that the virtual antenna elements in the virtual antenna arrangement are arranged without overlap; and
wherein a transmitting element group or the transmitting arrangement includes five transmitting elements or a receiving element group or the receiving arrangement includes five receiving elements, wherein three transmitting elements are arranged in three linearly adjacent fields, and two transmitting elements are arranged perpendicularly symmetrically thereto in adjacent fields, or wherein three receiving elements are arranged in three linearly adjacent fields, and two receiving elements are arranged perpendicularly symmetrically thereto in adjacent fields.

13. The radar antenna arrangement according to claim 12, having three transmitting element groups or receiving element groups which are arranged 120° rotationally symmetrically and have an additional common transmitting element or receiving element to which the transmitting element groups or receiving element groups are adjacent.

14. The radar antenna arrangement according to claim 12, wherein the five transmitting elements or the five receiving elements are loosely connected in a same configuration in which three elements are configured linearly and two elements are configured symmetrically perpendicularly, wherein each transmitting element or each receiving element is surrounded by six unoccupied fields of the regularly hexagonally parqueted surface.

15. A radar antenna arrangement, comprising:
transmitting elements; and
receiving elements;
wherein the transmitting elements are arranged in a transmitting arrangement and the receiving elements are arranged in a receiving arrangement, in each case in fields of a regularly hexagonally parqueted surface;
wherein an associated virtual antenna arrangement of virtual antenna elements results from the geometrical convolution of the transmitting arrangement with the receiving arrangement;
wherein the receiving elements in the receiving arrangement and the transmitting elements in the transmitting arrangement are arranged such that the virtual antenna elements in the virtual antenna arrangement are arranged without overlap;
wherein the transmitting elements and the receiving elements are arranged without overlap in fields of a common regularly hexagonally parqueted surface;
wherein a plurality of the transmitting elements form a transmitting element group and/or a plurality of the receiving elements form a receiving element group;
wherein the radar antenna arrangement has a plurality of similar transmitting element groups and/or receiving element groups;
wherein the plurality of similar transmitting element groups and/or the plurality of similar receiving element groups are arranged such that the transmitting arrangement and/or the receiving arrangement has a rotational symmetry of 60° or a rotational symmetry of 120°, and
wherein three 120° rotationally symmetrically arranged transmitting element groups or receiving element groups each having 21 transmitting elements or 21 receiving elements wherein the three transmitting element groups or receiving element groups are adjacent to a common separate central transmitting element or receiving element.

16. A radar antenna arrangement, comprising:
transmitting elements; and
receiving elements;
wherein the transmitting elements are arranged in a transmitting arrangement and the receiving elements are arranged in a receiving arrangement, in each case in fields of a regularly hexagonally parqueted surface;
wherein an associated virtual antenna arrangement of virtual antenna elements results from the geometrical convolution of the transmitting arrangement with the receiving arrangement;
wherein the receiving elements in the receiving arrangement and the transmitting elements in the transmitting arrangement are arranged such that the virtual antenna elements in the virtual antenna arrangement are arranged without overlap;
wherein the number of transmitting elements to the number of receiving elements is in the ratio 3 to 4.

17. The radar antenna arrangement according to claim 1, wherein a plurality of the transmitting elements form a transmitting element group and/or a plurality of the receiving elements form a receiving element group;
wherein the radar antenna arrangement has a plurality of similar transmitting element groups and/or receiving element groups; and
wherein the plurality of similar transmitting element groups and/or the plurality of similar receiving element groups are arranged such that the transmitting arrangement and/or the receiving arrangement has a rotational symmetry of 60° or a rotational symmetry of 120°.

18. A radar antenna arrangement, comprising:
transmitting elements; and
receiving elements;
wherein the transmitting elements are arranged in a transmitting arrangement and the receiving elements are arranged in a receiving arrangement, in each case in fields of a regularly hexagonally parqueted surface;

wherein an associated virtual antenna arrangement of virtual antenna elements results from the geometrical convolution of the transmitting arrangement with the receiving arrangement;

wherein the receiving elements in the receiving arrangement and the transmitting elements in the transmitting arrangement are arranged such that the virtual antenna elements in the virtual antenna arrangement are arranged without overlap;

wherein a plurality of the transmitting elements form a transmitting element group and/or a plurality of the receiving elements form a receiving element group; and wherein the radar antenna arrangement has a plurality of similar transmitting element groups and/or receiving element groups; and wherein three transmitting elements each form a densely packed triangular transmitting element group and a total of six of these transmitting element groups are uniformly distributed on the transmitting circular circumference, with a further one of these transmitting element groups being arranged in the center of the transmitting circular circumference; or wherein three receiving elements each form a densely packed triangular receiving element group and a total of six of these receiving element groups are distributed uniformly on the receiving circular circumference, with a further one of these receiving element groups being arranged in the center of the receiving circular circumference.

* * * * *